United States Patent
Yu

[11] Patent Number: 6,113,040
[45] Date of Patent: Sep. 5, 2000

[54] GUITAR STAND

[76] Inventor: Ming-Ti Yu, 122-5, Jun Liao Road, Feng Yuan, Taichung Hsien, Taiwan

[21] Appl. No.: 09/306,658

[22] Filed: May 5, 1999

[51] Int. Cl.[7] .................................................. F16M 11/38
[52] U.S. Cl. ........................................ 248/166; 248/440.1
[58] Field of Search ................................ 248/440.1, 170, 248/166

[56] References Cited

U.S. PATENT DOCUMENTS

| | | | |
|---|---|---|---|
| 5,383,634 | 1/1995 | Liao | 248/166 |
| 5,505,413 | 4/1996 | Hennessey | 248/166 |
| 5,836,552 | 11/1998 | Yu | 248/166 |
| 5,957,417 | 9/1999 | Yu | 248/166 |

*Primary Examiner*—Ramon O. Ramirez
*Assistant Examiner*—A. Joseph Wujciak

[57] ABSTRACT

A guitar stand has a hollow upper block, a hollow main rod inserted in a bottom of the hollow upper block, a hollow lobe-shaped seat disposed on the hollow main rod, and a connection seat and the hollow lobe-shaped seat fastened by a screw spindle. A first pivot joint is disposed on an upper end of a first hollow leg. A second pivot joint is disposed on an upper end of a second hollow leg. The second pivot joint is inserted in the first pivot joint. The connection seat has a screw rod fastening the first pivot joint and the second pivot joint together. The first bracket is fastened on the first hollow leg. The second bracket is fastened on the second hollow leg.

1 Claim, 5 Drawing Sheets

GUITAR STAND

BACKGROUND OF THE INVENTION

The invention relates to a guitar stand. More particularly, the invention relates to a guitar stand which can be easily folded.

U.S. Pat. No. 5,713,547 has disclosed a guitar stand which has a main hollow rod, a first hollow leg, a second hollow leg, a first brace, a second brace, a first bracket, and a second bracket. A pivot means fastens the first hollow leg and the second hollow leg on the main hollow rod pivotally. A hollow upper block is disposed on top of the main hollow rod. The pivot means has a lobe, a transverse plate and a longitudinal plate which is disposed on top of the transverse plate. A main hollow rod has a lobe disposed on an upper portion of the main hollow rod. A circular hole and a curved hole are formed on the main hollow rod. A hollow upper block has a lower protrusion inserted in an upper end of the main hollow rod. A first and a second round cushions are disposed adjacent to a first and a second sides of the hollow upper block, respectively. The first round cushion has a first center hole. The second round cushion has a second center hole. A first bolt passes through the first center hole to fasten the first round cushion on the hollow upper block. A second bolt passes through the second center hole to fasten the second round cushion on the hollow upper block. A longitudinal plate is disposed on a top of the transverse plate. The longitudinal plate has an upper hole to match the corresponding circular hole and a lower hole to match the corresponding curved hole. A first fastening member passes through the circular hole and the upper hole and a second fastening member passes through the lower hole and the curved hole to fasten the lobe and the longitudinal plate together. A first and a second joints are disposed on the first and the second hollow legs, respectively. Each of the first and the second joints has a threaded lower portion inserted in a top interior of the corresponding hollow leg, an annular flange abutting the threaded lower portion, and a top recess to receive the transverse plate. A bevel is disposed beneath the top recess. A notch is formed on a top rim of the first hollow leg. A third and a fourth fastening members fasten the first and the second joints on the transverse plate. The first brace is fastened on a lower portion of the first hollow leg. The second brace is fastened on a lower portion of the second hollow leg. A first hook extends from a top end of the first bracket to be inserted in the first brace. A second hook extends from a top end of the second bracket to be inserted in the second brace. However, the hollow leg will be detached from the respective joint if the user extends the hollow leg to the utmost.

SUMMARY OF THE INVENTION

An object of the present invention is to provide a guitar stand which is easily folded.

Another object of the present invention is to provide a guitar stand which can lower the center of gravity of the guitar while the guitar is rested on the guitar stand.

Yet another object of the present invention is to provide a guitar stand which has two bent hollow legs to support a guitar stably.

Accordingly, a guitar stand comprises a hollow main rod, a hollow upper block, a first hollow leg, a second hollow leg, a first pivot joint, a second pivot joint, a connection seat, a first bracket, and a second bracket. The hollow main rod is inserted in a bottom of the hollow upper block. The hollow upper block has two lateral bolts inserted in two annular cushions. A hollow lobe-shaped seat is disposed on an upper portion of the hollow main rod. The hollow lobe-shaped seat has a through hole and a notch communicating with the through hole. The connection seat has a cylinder body, a screw rod disposed on the cylinder body, and an upper plate disposed on an upper portion of the cylinder body. The upper plate has a circular hole and a blocking end. The upper plate is inserted in the hollow lobe-shaped seat. The upper plate and the hollow lobe-shaped seat are fastened by a screw spindle via two washers, the through hole, and the circular hole. The screw spindle has a protrusion inserted in the notch. The first pivot joint is disposed on an upper end of the first hollow leg. The first pivot joint has a groove, an axle hole, a first blocking flange, and a first block. The second pivot joint is disposed on an upper end of the second hollow leg. The second pivot joint has a pivot hole, a second blocking flange, and a second block. The second pivot joint is inserted in the groove of the first pivot joint. The screw rod fastens the first pivot joint and the second pivot joint together via the pivot hole and the axle hole. When the first hollow leg and the second hollow leg are extended, the first blocking flange and the second blocking flange block the upper plate. When the first hollow leg and the second hollow leg are folded, the first block and the second block block the upper plate. The first hollow leg has a first pipe and a first bent end portion. The second hollow leg has a second pipe and a second bent end portion. The first bracket is fastened on a lower portion of the first hollow leg. The first bracket has a first brace fastened on the first hollow leg, a first connector disposed on the first brace, and a first U-shaped bar connected to the first connector. The second bracket is fastened on a lower portion of the second hollow leg. The second bracket has a second brace fastened on the second hollow leg, a second connector disposed on the second brace, and a second U-shaped bar connected to the second connector.

DETAILED DESCRIPTION OF THE INVENTION

Figure 1:
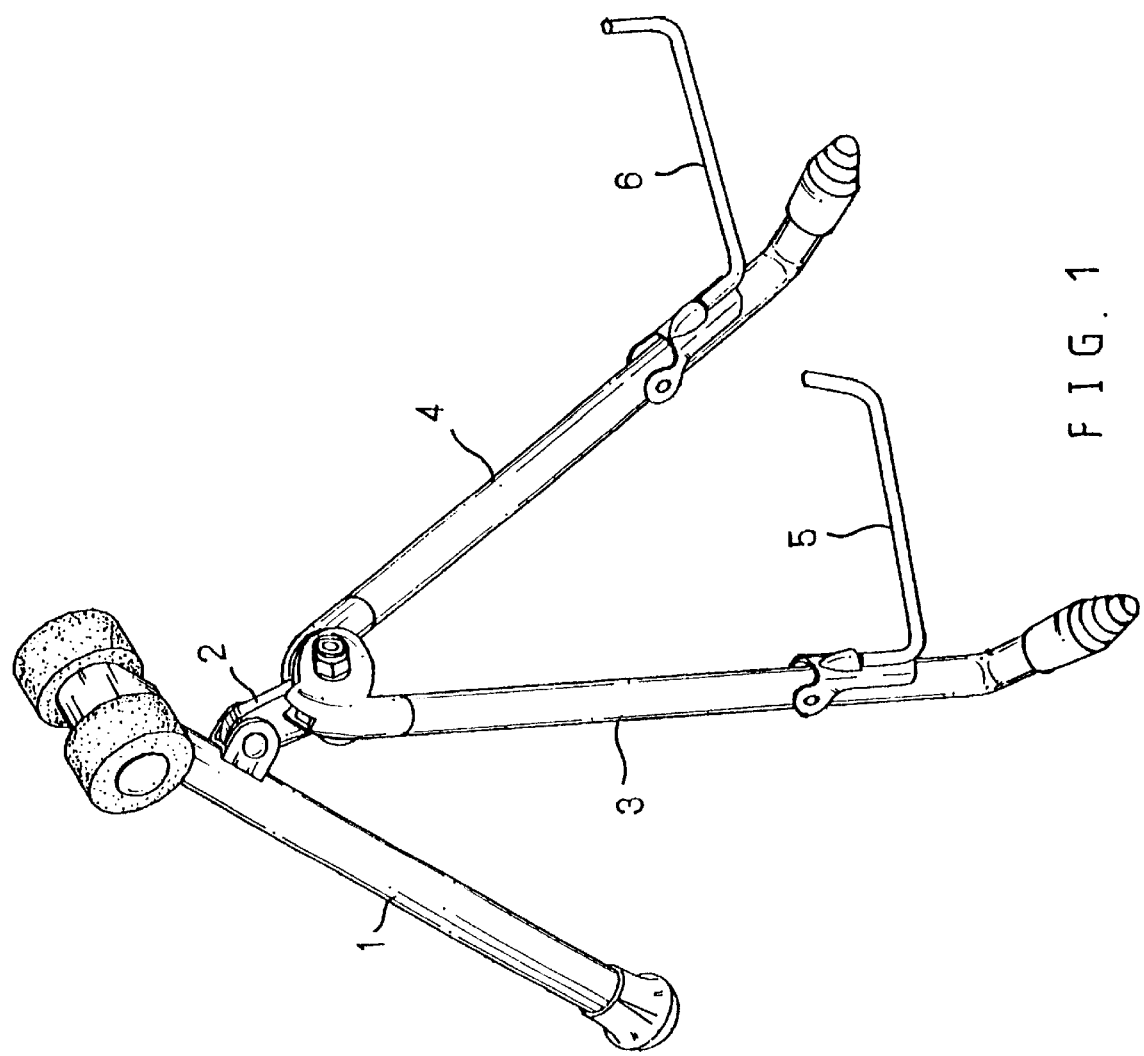
FIG. 1 is a perspective assembly view of a guitar stand of a preferred embodiment in accordance with the present invention.

Referring to FIGS. 1 to 5, a guitar stand comprises a hollow main rod 1, a hollow upper block 11, a first hollow leg 3, a second hollow leg 4, a first pivot joint 32, a second pivot joint 42, a connection seat 2, a first bracket 5, and a second bracket 6.

The hollow main rod 1 is inserted in a bottom of the hollow upper block 11.

The hollow upper block 11 has two lateral bolts 111 inserted in two annular cushions 12.

A hollow lobe-shaped seat 21 is disposed on an upper portion of the hollow main rod 1. The hollow lobe-shaped seat 21 has a through hole 211 and a notch 212 communicating with the through hole 211.

The connection seat 2 has a cylinder body 22, a screw rod 222 disposed on the cylinder body 22, and an upper plate 221 disposed on an upper portion of the cylinder body 22. The upper plate 221 has a circular hole 223 and a blocking end 224.

The upper plate 221 is inserted in the hollow lobe-shaped seat 21.

The upper plate 221 and the hollow lobe-shaped seat 21 are fastened by a screw spindle 23 via two washers 24, the through hole 211, and the circular hole 223. The screw spindle 23 has a protrusion 231 inserted in the notch 212. When the upper plate 221 rotates, the upper plate 221 will not drive the screw spindle 23 to rotate.

The first pivot joint 32 is disposed on an upper end of the first hollow leg 3. The first pivot joint 32 has a groove 324, an axle hole 321, a first blocking flange 322, and a first block 323.

The second pivot joint 42 is disposed on an upper end of the second hollow leg 4. The second pivot joint 42 has a pivot hole 421, a second blocking flange 422, and a second block 423.

The second pivot joint 42 is inserted in the groove 324 of the first pivot joint 32.

The screw rod 222 fastens the first pivot joint 32 and the second pivot joint 42 together via the pivot hole 421 and the axle hole 321. A nut 25 engages with the screw rod 222.

When the first hollow leg 3 and the second hollow leg 4 are extended, the first blocking flange 322 and the second blocking flange 422 block the upper plate 221.

When the first hollow leg 3 and the second hollow leg 4 are folded, the first block 323 and the second block 423 block the upper plate 221.

The first hollow leg 3 has a first pipe 31 and a first bent end portion 30.

The second hollow leg 4 has a second pipe 41 and a second bent end portion 40.

Figure 2:
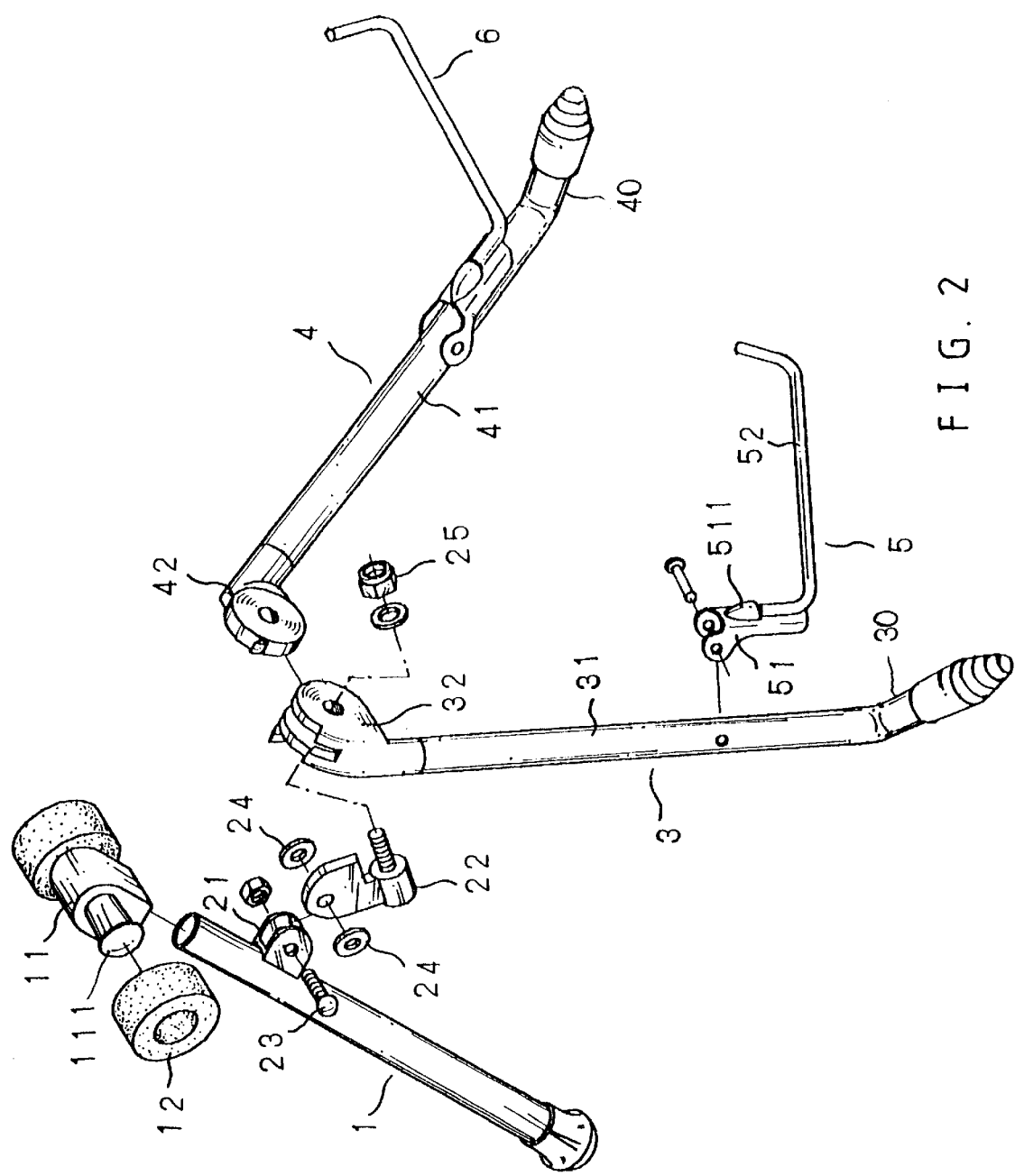
FIG. 2 is a perspective exploded view of a guitar stand of a preferred embodiment in accordance with the present invention.
Figure 3:
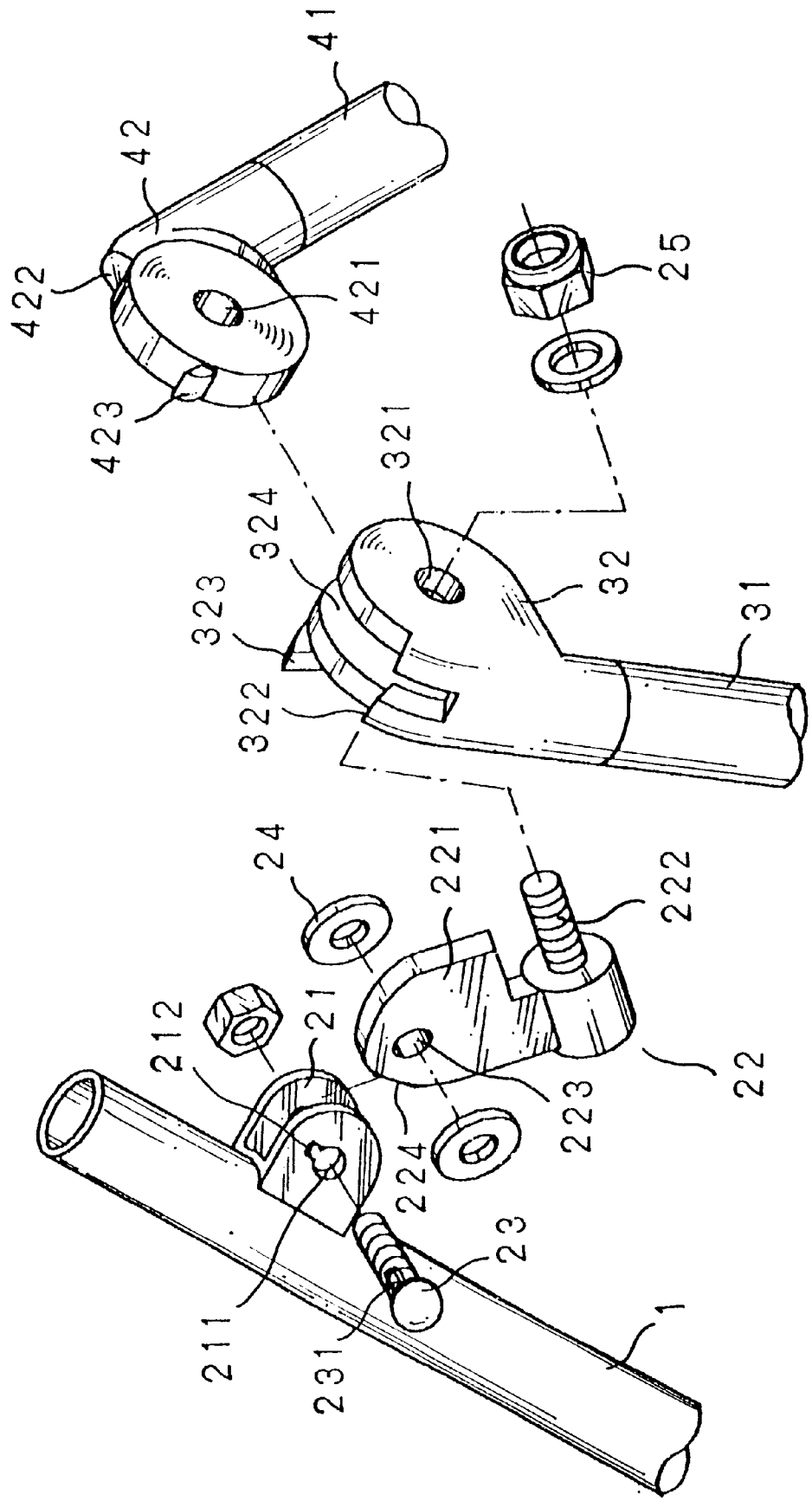
FIG. 3 is a perspective exploded view of a hollow lobe-shaped seat, a connection seat, a first pivot joint, and a second pivot joint of a preferred embodiment in accordance with the present invention.

Referring to FIGS. 1 and 2, the first bracket 5 is fastened on a lower portion of the first hollow leg 3. The first bracket 5 has a first brace 51 fastened on the first hollow leg 3, a first connector 511 disposed on the first brace 51, and a first U-shaped bar 52 connected to the first connector 511.

Figure 4:
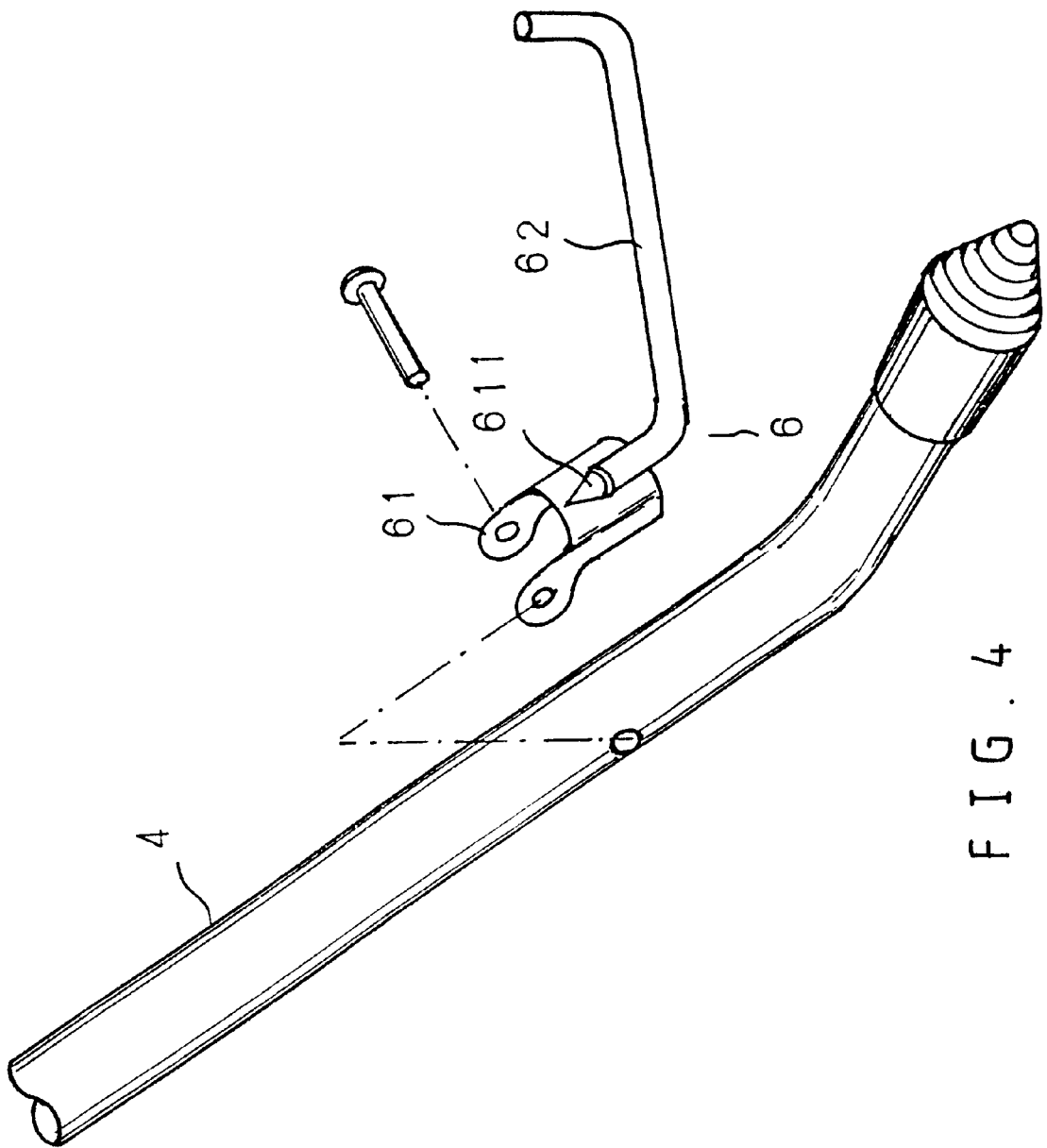
FIG. 4 is a perspective exploded view of a second hollow leg and a second bracket.
Figure 5:
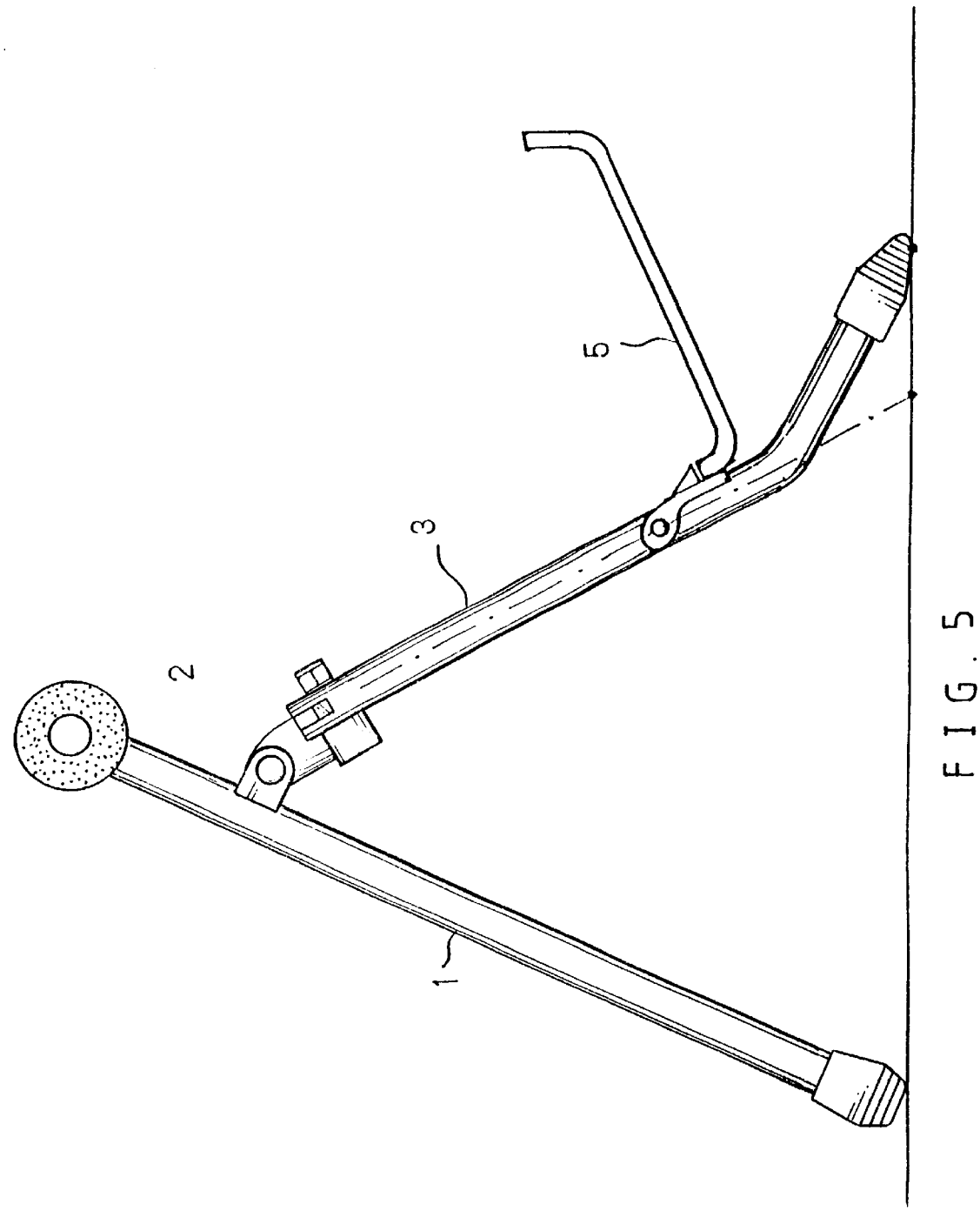
FIG. 5 is an elevational view of FIG. 1.

Referring to FIGS. 1 and 4, the second bracket 6 is fastened on a lower portion of the second hollow leg 4. The second bracket 6 has a second brace 61 fastened on the second hollow leg 4, a second connector 611 disposed on the second brace 61, and a second U-shaped bar 62 connected to the second connector 611.

Referring to FIG. 1, the hollow main rod 1, the first hollow leg 3, and the second hollow leg 4 are extended.

The center of gravity of a guitar is lowered while the guitar is rested on the guitar stand.

The present invention is not limited to the above embodiment but various modification thereof may be made. Furthermore, various changes in form and detail may be made without departing from the scope of the present invention.

I claim:

1. A guitar stand comprises:

a hollow main rod, a hollow upper block, a first hollow leg, a second hollow leg, a first pivot joint, a second pivot joint, a connection seat, a first bracket, and a second bracket, the hollow main rod inserted in a bottom of the hollow upper block, the hollow upper block having two lateral bolts inserted in two annular cushions, a hollow lobe-shaped seat disposed on an upper portion of the hollow main rod, the hollow lobe-shaped seat having a through hole and a notch communicating with the through hole, the connection seat having a cylinder body, a screw rod disposed on the cylinder body, and an upper plate disposed on an upper portion of the cylinder body, the upper plate having a circular hole and a blocking end, the upper plate inserted in the hollow lobe-shaped seat, the upper plate and the hollow lobe-shaped seat fastened by a screw spindle via two washers, the through hole, and the circular hole, the screw spindle having a protrusion inserted in the notch, the first pivot joint disposed on an upper end of the first hollow leg, the first pivot joint having a groove and an axle hole, the second pivot joint disposed on an upper end of the second hollow leg, the second pivot joint having a pivot hole, the second pivot joint inserted in the groove of the first pivot joint, the screw rod fastening the first pivot joint and the second pivot joint together via the pivot hole and the axle hole, the first hollow leg having a first pipe and a first bent end portion, the second hollow leg having a second pipe and a second bent end portion, the first bracket fastened on a lower portion of the first hollow leg, the first bracket having a first brace fastened on the first hollow leg, a first connector disposed on the first brace, and a first U-shaped bar connected to the first connector, the second bracket fastened on a lower portion of the second hollow leg, the second bracket having a second brace fastened on the second hollow leg, a second connector disposed on the second brace, and a second U-shaped bar connected to the second connector, the first pivot joint further having a first blocking flange and a first block, and the second pivot joint further having a second blocking flange and a second block.

* * * * *